Feb. 12, 1957 L. D. CARUFEL 2,781,056
HYDRAULIC VALVE CONTROL FOR REVERSING TRANSMISSION
Filed Feb. 12, 1953
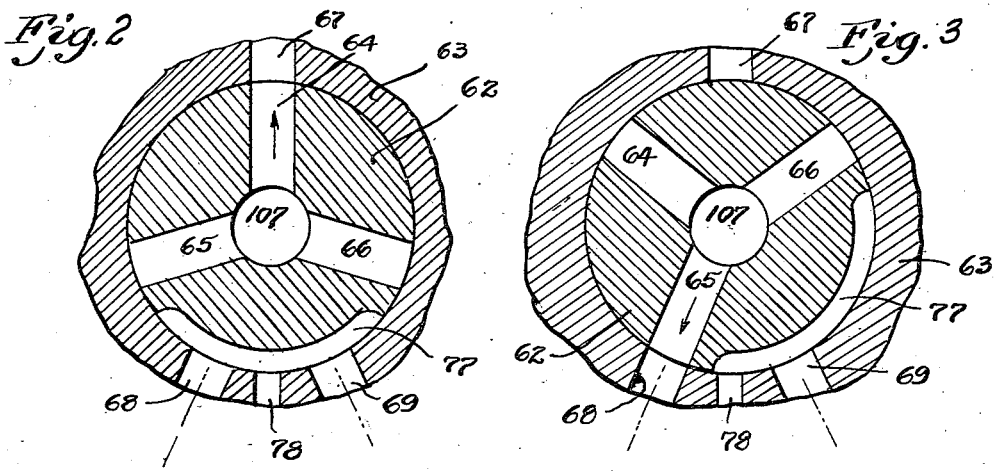
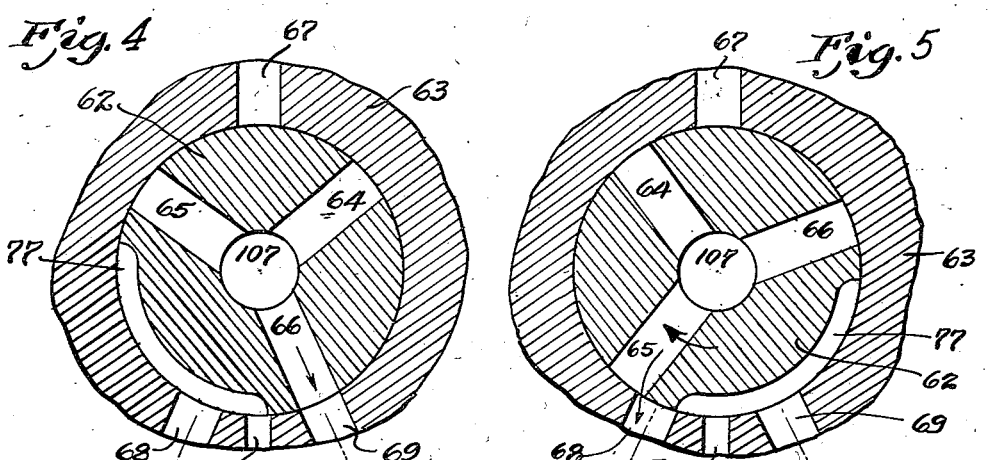
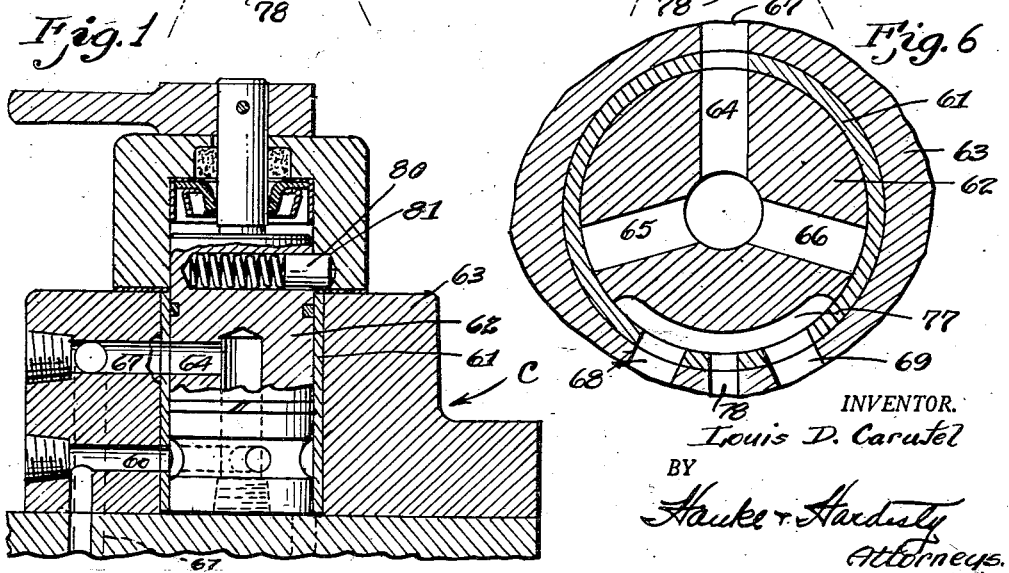
INVENTOR.
Louis D. Carufel
BY
Hauke & Hardesty
Attorneys.

US Patent Office
2,781,056
Patented Feb. 12, 1957

2,781,056

HYDRAULIC VALVE CONTROL FOR REVERSING TRANSMISSION

Louis D. Carufel, Muskegon, Mich., assignor to Continental Motors Corporation, Detroit and Muskegon, Mich., a corporation of Virginia Application February 12, 1953, Serial No. 336,607

2 Claims. (Cl. 137—624)

This invention relates to a reversing transmission assembly and more particularly to a hydraulic valve control for successively actuating a plurality of hydraulic instrumentalities in the operation of said transmission.

Transmissions of the type embodying the valve herein illustrated are generally employed for service with a power driven machine such as a transit cement mixer, various types of earth moving machinery or other industrial machines in which a relatively heavy load of material is to be moved. Such machines or equipment are moved forward or reverse, and when such transmission is applied to a cement mixer or other earth moving machinery and the like, carrying heavy loads, the transmission must be capable of quickly stopping and reversing the load without placing an undue load on other parts of the machine. In the case of a cement mixer carrying a heavy load of wet cement, weighing in the neighborhood of from four to seven or eight tons, the machine is constructed so that it can be slowly agitated in transit and further constructed so that the cement drum can be reversed in order to discharge the contents thereof, and again quickly reversed if need be, to cut off the discharge of wet cement.

The torque required to rotate the drum of a cement mixer or other machine is many times the torque produced by the engine, and the transmissions as are presently employed to transmit and multiply the engine torque to said drum and to drive same at a speed of approximately about ten revolutions per minute are in general quite bulky and massive because they employ a reversing mechanism operating on the output side of the reduction drive transmission.

With such mechanisms, the control is usually manually operated and the timing of such successive operations is of vital importance. Speed in changing from forward to reverse drive is required, but the movement from forward speed to a full stop and then to reverse or vice versa must be had very quickly, but not so instantaneous as to subject the various operating parts of the machine to excessive strains and stress which may snap or break such machine mechanisms.

An object of the present invention is to provide controlling means satisfactory for a transit cement mixer and other power machines or equipment by constructing a manually operated control valve so constructed to successively exhaust certain hydraulic lines before supplying fluid under pressure to other lines.

For a more detailed understanding of the invention, reference may be had to the accompanying drawings illustrating a preferred embodiment of the invention showing one application thereof, wherein like characters refer to like parts throughout the several views, and in which:

Fig. 1 is a sectional view through the valve.

Figs. 2 to 6 inclusive are enlarged fragmentary diagrammatic detail plan sectional view of the valve showing various positions assumed by said valve parts.

One type of machine, for which the present power transmission means is particularly practical is a transit cement mixer, and such an application is preferably illustrated and described herein, but obviously a mechanism of this character may be usefully applied to machines and powered equipment other than transit cement mixers.

A control valve assembly C is illustrated in Fig. 1 as having an inlet 60. A special valve 62 is rotatably mounted in the valve casing 63 and is actuated to distribute the oil under pressure to oil passages 64, 65 and 66 which respectively connect with passages 67, 68 and 69. Passage 67 preferably leads to the brake means of a reversing transmission while passage 68 and passage 69 preferably lead to the transmission clutches.

In most instances the valve 62 is mounted within a sleeve 61 in the valve assembly to reduce wear to a minimum and to generally provide an improved valve assembly having ideal operating characteristics. In Figs. 2 to 6 inclusive, there are shown diagrammatic illustrations of the valve structure, and for purposes of clearness, the sleeve detail is left out, since the sleeve per se is not a part of this invention.

When at rest, the disposition of the valve takes the position indicated in Figs. 2 and 6, the oil under pressure being fed to the brake, because passage 67 is aligned with valve passage 64. The valve is rotated from the position of Fig. 2 counterclockwise to bring passage 68 into registration with the valve outlet passage 65 actuating one clutch of the transmission. To actuate another clutch, the valve is rotated clockwise from the Fig. 3 position to Fig. 4 position and said valve passage 64 passes the passage 67, before valve passage 66 is moved into registration with passage 69, thus momentarily setting the brake and bringing the transmission to a complete stop prior to being reversed.

A suitable bleed is provided from the brake to the interior of the transmission casing and as soon as the valve 62 cuts off the supply of oil under pressure to this passage, the pressure in passage 67 immediately drops, permitting the rapid retraction of the brake.

Referring to Fig. 5, it will be observed that the valve is being rotated clockwise and the passages 68 and 65 are just about to be moved out of registration and the annular passage or recess 77 is about to be moved into registration with passage 68, thus venting the passage 68 as said annular passage is in registration with passage preferably 78 leading to the interior of the transmission casing. It is noted also that the dimensions from the passages 65 and 66 to the respective ends of the groove 77 are slightly less than the arcuate dimensions of ports 68 and 69, providing a momentary overlap between pressurizing and venting.

Likewise, as the valve is moved counterclockwise from the position of Fig. 4 where passages 69 and 66 are in registration, to the position illustrated by Fig. 3, the passage 69 is brought into registration with the annular passage 77 after passages 69 and 66 are removed out of registration, so as to vent the pressure in passage 69. In moving the valve from the position (Fig. 3) to position (Fig. 4) or vice versa, the passage 64 is always momentarily brought into registration with passage 67 leading to the brake.

The spring pressed pawl or pin 80 rides in the annular slot 81 having annularly spaced recesses 82 so disposed as to locate the valve in reverse, forward or neutral position. This slot 81 also limits the movement of the valve.

In the application of the present invention to a transit cement mixer, the speed of the unit (a cement drum in this instance) is perhaps in the neighborhood of about 6 to 12 R. P. M., as compared to an engine speed of around 1200 to 1600 R. P. M., a speed reduction of about 200 times. In other applications, such as earth moving equipment and material moving trucks and other machines, with which the present invention may be desirably assembled; the part to be driven away may not be of a speed as low as the cement drum of a transit mixer, but in all such applications, it is found quite desirable and preferable to change from forward to reverse, or to neutral by mechanism operable to function at engine speed. As such speeds are reduced from engine speed or direct drive to 4:1, 10:1, 50:1, or 100 to 200:1, the torque is correspondingly increased. Therefore, a reversing transmission operable on machine elements operating at such reduced speeds must be correspondingly massive and of such construction as to carry these heavy loads.

In the present assembly, the reversing mechanism is operable on driving and driven shafts operating at engine speed, and this combination is specially useful and advantageous with power driven machines, such as transit concrete mixers and heavy earth moving machines, especially those requiring frequent reversal of the drive. Thus a quick acting positive valve mechanism such as herein illustrated and described is especially applicable to a reversing transmission operable at engine speed.

It will be apparent to those skilled in the art to which this invention pertains that various changes and modifications may be made therein, without departing from the spirit of the invention or from the scope of the appended claims.

I claim:

1. A unitary hydraulic valve control means applicable for controlling a plurality of coacting operating means of an assembled mechanism such as a reversing transmission having driving and driven elements and a plurality of pressure actuated means, said unitary hydraulic valve control means comprising a valve casing, and a valve structure rotatably oscillating therein, said valve casing having a fluid pressure inlet means, a vent outlet means, and a plurality of pressure outlet means respectively adapted for successive connection with said plurality of pressure actuated means of said mechanism, one of said pressure outlet means being angularly offset from one side of said vent outlet means, another of said pressure outlet means being angularly offset an equal distance from the opposite side of said vent outlet means, said valve structure provided with a receiver communicating at all times with the fluid pressure inlet of said casing and having separate outlet passages communicating with said receiver and adapted to be successively placed into communication with said plurality of pressure outlet means of said valve casing, said valve structure having an arcuate exhaust passage separate from said outlet passages and arranged for open connection at all times with said vent outlet means and for alternate communication with each of said offset pressure outlet means, one of said outlet passages being angularly offset from one end of said arcuate exhaust passage, another of said outlet passages being angularly offset an equal distance from the other end of said arcuate exhaust passage, the arcuate dimensions from said offset outlet passages to the ends of said arcuate exhaust passage being substantially equal to but slightly less than the arcuate dimensions of said offset pressure outlet means whereby to provide a slight overlap between pressurizing and exhausting of same, said arcuate exhaust passage thereby being disposed in timed relationship with respect to said offset outlet passages on oscillation of said valve structure to exhaust a previously pressurized offset outlet means substantially immediately before pressurization is removed therefrom and prior to the succeeding opening of the other offset outlet means, said arcuate exhaust passage of said valve structure comprising an arcuate annular groove extending about the periphery of said valve structure and communicating at all times with said vent outlet means of said casing, said arcuate groove moved to vent only such offset outlet means which are out of registration with pressurized outlet passages.

2. A unitary hydraulic valve control means applicable for controlling a plurality of pressure actuated means, said unitary hydraulic valve control means comprising a valve casing, and a valve structure rotatably oscillating therein, said valve casing having a fluid pressure inlet means, a vent outlet means, and a plurality of pressure outlet means respectively adapted for successive connection with said plurality of pressure actuated means of said mechanism, one of said pressure outlet means being angularly offset from one side of said vent outlet means, another of said pressure outlet means being angularly offset an equal distance from the opposite side of said vent outlet means, said valve structure provided with a receiver communicating at all times with the fluid pressure inlet of said casing and having separate outlet passages communicating with said receiver and adapted to be successively placed into communication with said plurality of pressure outlet means of said valve casing, said valve structure having an arcuate exhaust passage separate from said outlet passages, one of said outlet passages being angularly offset from one end of said arcuate exhaust passage, another of said outlet passages being angularly offset an equal distance from the other end of said arcuate exhaust passage, the arcuate dimensions from said offset outlet passages to the ends of said arcuate exhaust passage being substantially equal to but slightly less than the arcuate dimensions of said offset pressure outlet means whereby to provide a slight overlap between pressurizing and exhausting of same, said arcuate exhaust passage thereby being disposed in timed relationship with respect to said offset outlet passages on oscillation of said valve structure to exhaust a previously pressurized offset outlet means substantially immediately before pressurization is removed therefrom and prior to the succeeding opening of the other offset outlet means, said casing having a third pressure outlet means, and a third outlet passage in said valve structure disposed substantially medially between said offset outlet passages and opposite to said arcuate exhaust passage, whereby said third outlet passage will be momentarily connected with said third outlet means subsequent to exhausting of the one offset outlet means, and prior to opening of the other offset outlet means.

References Cited in the file of this patent

UNITED STATES PATENTS

| Number | Name | Date |
|---|---|---|
| 505,489 | See | Sept. 26, 1893 |
| 1,510,129 | Argy | Sept. 30, 1924 |
| 1,677,499 | Smith | July 17, 1928 |
| 2,398,542 | Light | Apr. 16, 1946 |
| 2,557,586 | Anderson et al. | June 19, 1951 |
| 2,586,623 | Detrez | Feb. 19, 1952 |
| 2,593,039 | Livers et al. | Apr. 15, 1952 |
| 2,613,773 | Gilfillan | Oct. 14, 1952 |
| 2,655,167 | Dunkelow | Oct. 13, 1953 |